United States Patent [19]

Halasa

[11] 3,954,700
[45] May 4, 1976

[54] POLYMERIZATION WITH ORGANO SODIUM CATALYST DISSOLVED IN HEXAMETHYLPHOSPHOROTRIAMIDE

[75] Inventor: Adel Farhan Halasa, Bath, Ohio

[73] Assignee: The Firestone Tire & Rubber Company, Akron, Ohio

[22] Filed: July 11, 1975

[21] Appl. No.: 594,993

[52] U.S. Cl. ............ 526/179; 526/174; 526/175; 526/335; 526/339; 526/340
[51] Int. Cl.$^2$ .................. C08F 4/46; C08F 4/48
[58] Field of Search ........ 260/94.6, 94.2 M, 94.2 T, 260/84.7, 82.1; 450/684.5

[56] References Cited
UNITED STATES PATENTS

| | | |
|---|---|---|
| 3,207,742 | 9/1965 | Van de Castle ............ 260/94.6 |
| 3,217,050 | 10/1965 | Schriesheim et al. ............ 260/668 |
| 3,288,872 | 11/1966 | House ............ 260/669 |
| 3,331,821 | 7/1967 | Stroble ............ 260/94.2 T X |
| 3,647,803 | 3/1972 | Schlott et al. ............ 260/94.6 X |
| 3,776,893 | 12/1973 | Naylor et al. ............ 260/94.6 X |

Primary Examiner—William F. Hamrock

[57] ABSTRACT

Shortcomings in the use of metallic sodium as a catalyst for the polymerization of dienes are overcome by carrying the polymerization out in a hydrocarbon solvent with organosodium as the catalyst, using a chelating amide such as hexamethylphosphorotriamide.

4 Claims, No Drawings

POLYMERIZATION WITH ORGANO SODIUM CATALYST DISSOLVED IN HEXAMETHYLPHOSPHOROTRIAMIDE

PRIOR ART

Van de Castle U.S. Pat. No. 3,207,742 discloses the preparation of high vinyl polybutadiene with a molecular weight of 5,000 to 200,000 using (1) n-butyl lithium or other lithium hydrocarbon catalyst and (2) hexamethylphosphoramide. It does not suggest the use of an organosodium catalyst.

Schriesheim et al. U.S. Pat. No. 3,217,050 discloses the use of a phosphoramide such as hexamethylphosphoramide as a solvent for sodium; and the solution may be used for the polymerization of butadiene. The patent mentions benzyl sodium as a telomerization catalyst for polymerization of butadiene and the production of oils, and it discloses a solution of benzyl potassium in hexamethylphosphorotriamide but does not suggest the use of organosodium or organopotassium as a polymerization catalyst.

SUMMARY OF THE INVENTION

Sodium metal is known as a catalyst for the polymerization of dienes, but it reacts very slowly. Alkyl and aryl derivatives of sodium such as n-butyl sodium act rapidly, but transfer occurs so that the yield is low and only low-molecular weight polymers can be formed. It is also known that organosodium compounds are strong bases and can cleave amides and amines as well as ethers.

According to this invention, an organosodium catalyst is used as the catalyst in the polymerization of 1,3-conjugated diene containing 4 to 8 carbon atoms and production of homopolymers and copolymers of such conjugated dienes and copolymers thereof with vinyl monomers, the polymerization being carried out in the presence of hexalkylphosphorotriamide (HAPA), the formula for which is $(R_2N)_3 P=O$ in which R is an alkyl group containing 1 to 4 or more carbon atoms. The methyl derivative (HMPA) is preferred. No substantial transfer occurs in this solvent, and high conversion of the monomer to polymer is obtained. The polymer produced is desirable because of its broad molecular weight distribution and resulting excellent processability. Furthermore, the polymer has a high content, 70 per cent or more, of 1,2-polymer. It appears that the use of HAPA stabilizes the allylic sodium and thus prevents transfer.

The preferred catalyst is n-butyl sodium, but other RNa catalysts may be used including alkyl sodium in which the alkyl group contains 4 to 8 carbon atoms, including the normal and branched butyl, pentyl, hexyl, heptyl and octyl sodiums or an aryl such as phenyl. From 0.5 to 5 millimoles of RNa, based on the weight of the sodium, will be used phgm, although the preferred range for making the rubber is 0.8 millimoles to 1.5 millimoles phg monomer.

It is possible, by the process of this invention, to produce polymers of the molecular weight of rubbers, i.e. molecular weights of 50,000 to 1,000,000 and particularly over 100,000, whereas polymers produced in the same manner without HMPA have only low-molecular weights of about 5,000 to 20,000 and are usually known as oils in which the molecules contain 10 to 20 diene units. The polymers may be termed as living polymers in which the catalyst level determines the molecular weight and microstructure. A higher catalyst level produces low molecular weight polymer while a lower catalyst level produces higher molecular weight polymer as is usual in anionic polymerizations.

The ratio of organosodium to HAPA depends upon the molecular weight required and the microstructure desired. If a higher content of 1,2-polymer (i.e. vinyl content) of about 90 percent or over is needed, one uses a low Na/HAPA ratio of about 0.001. That is, for every millimole of organosodium compound, 1000 millimoles of HAPA is used. But for a lower vinyl content of only 60 to 80 per cent, a higher ratio of Na/HAPA up to about 10 is used. The HAPA level controls the vinyl content of the polymer produced as well as its molecular weight. It stabilizes the allylic sodium and prevents transfer.

The hexamethylphosphorotriamide may be used as the solvent, but because of its high cost it will usually be used in small amount in an aliphatic hydrocarbon solvent such as the saturated $C_5$ to $C_{10}$ hydrocarbons. Thus, the HAPA should be present in amounts equal to 0.10 to 100 mm. phgm (per hundred grams of monomer) and preferably 1 to 20 mm. phgm.

The reaction is carried out at a temperature of 0° to 100° C. and preferably at 0° to 50° C. The following tables give results of different experiments. The molecular weight of the polymer is expressed as density DSV. A DSV of at least 1.0 indicates that a rubber has been produced.

Table I shows the effect of adding HMPA with the catalyst to the butadiene polymerization reaction mixture. The different mixtures were polymerized under the same conditions of time and temperature.

TABLE I

| Butadiene, g | 100 | 100 | 100 | 100 |
|---|---|---|---|---|
| nBuNa, mM | 0.7 | 0.7 | 0.7 | 0.7 |
| HMPA, mM | 7.0 | 14.0 | 21.0 | 28 |
| DSV | 1.81 | 2.69 | 2.23 | 2.85 |
| % 1,2-vinyl content | 86.5 | 86.4 | 85.0 | 84.2 |
| Temp. °C. | 30 | 30 | 30 | 30 |
| % Conv. | 100 | 100 | 100 | 100 |

As the amount of HMPA was increased, the molecular weight increased, as shown by the increase in the viscosity, DSV, of the polymer. The vinyl content of the polymer was substantially constant, although it decreased slightly. This shows that the allylic sodium was stabilized with HAPA to yield high molecular weight polymer such as used in rubbery goods.

Table II shows that under comparable conditions of time and temperature, by adding lithium or potassium alkoxide, to the polymerization mixture, the percent conversion to polymer was increased, leaving less unreacted monomer. The molar amount of butoxide added, based on the weight of the alkali metal, is generally as great as the amount of sodium, but may be greater up to, for example, 5 percent to 25 percent of the amount of sodium in the organosodium used.

TABLE II

| Butadiene, g | 100 | 100 | 100 | 100 | 100 |
|---|---|---|---|---|---|
| nBuNa, mM | 1.0 | 1.0 | 1.0 | 1.0 | 1.0 |
| Li tert-butoxide,mM | 1.0 | 1.0 | 0.5 | 0.25 | 0.125 |
| HMPA, mM | 0 | 1.0 | 7.2 | 7.2 | 7.2 |
| Temp. °C. | 5 | 5 | 5 | 5 | 5 |
| DSV | 3.99 | 1.61 | 5.23 | 3.62 | 3.04 |
| Gel | | | | | |
| 1,2% Content | 86.5 | 68.4 | 89.0 | 82.9 | 86.3 |

TABLE II-continued

| % Conversion | 75 | 80 | 90 | — | — |
|---|---|---|---|---|---|

In addition to more stabilization of the allylic sodium, the ROLi enhances the rate of polymerization making it economically feasible to produce the product.

Also the lower temperature gave more complete conversion to the polymer.

As the Na/HMPA ratio decreased (at both higher and lower temperature), the vinyl content of the polymer decreased.

Table III shows the effect of different ratios of organosodium to HMPA at temperatures of 5° and 50°C. The 5-degree polymerization temperatures gave higher conversion than 50°C. and the low temperature polymerization gave higher molecular weight than the 50°C., although the polymers have the same 1,2 content.

TABLE III

| Sample Na/HMPA | 1,2% | DSV | % Conv. | Temp., °C. |
|---|---|---|---|---|
| 0.1 | 86.5 | 1.26 | 81.94 | 50 |
| 0.05 | 86.3 | 1.41 | 85.01 | 50 |
| 0.033 | 85.8 | 1.48 | 80.55 | 50 |
| 0.025 | 85.1 | — | 65.75 | 50 |
| 0.1 | 86.5 | 1.81 | 100. | 5 |
| 0.05 | 86.4 | 2.69 | 100. | 5 |
| 0.033 | 85.0 | 2.23 | 100. | 5 |

TABLE III-continued

| Sample Na/HMPA | 1,2% | DSV | % Conv. | Temp., °C. |
|---|---|---|---|---|
| 0.025 | 84.0 | 2.85 | 90.2 | 5 |

Thus, it is seen that the polymerization can be modified by adding potassium or lithium alkoxide. These alkali metal alkoxides speed up the reaction and increase the conversion to quantitative yields leaving no unreacted monomer. They are used in an amount equal to or greater than the amount of organosodium employed.

We claim:

1. The process of polymerizing a conjugated diene of the class consisting of conjugated dienes containing 4 to 8 carbon atoms, a mixture of such conjugated dienes and a mixture of such conjugated diene and a vinyl monomer, which process comprises polymerizing the monomer or monomers in a solution which contains (a) 0.5 to 5 millimoles of RNa per 100 grams of monomer, in which R is phenyl or an alkyl group of 4 to 8 carbon atoms, and (b) hexaalkylphosphorotriamide in which the alkyl group contains substantially 1 to 4 carbon atoms, the molar ratio of the sodium compound to hexaalkylphorotriamide being substantially 0.001 to 10, using a temperature of 0° to 100° C.

2. The process of claim 1 in which the polymerization is carried out at 0° to 50° C.

3. The process of claim 1 in which hexamethylphosphorotriamide is used.

4. The process of claim 1 in which lithium or potassium as alkoxide is used in an amount equal to 5 to 25 percent of the amount of sodium used.

* * * * *